United States Patent [19]

Lomax, Jr. et al.

[11] Patent Number: 5,261,720
[45] Date of Patent: Nov. 16, 1993

[54] VERTICALLY MOVING VEHICLE DOOR

[76] Inventors: Paul Lomax, Jr.; David Lomax; Paul A. Lomax, all of 3418 E. Shaw Butte, Phoenix, Ariz. 85028

[21] Appl. No.: 982,767

[22] Filed: Nov. 27, 1992

[51] Int. Cl.⁵ ............................................. B60J 5/00
[52] U.S. Cl. ............................ 296/146.9; 296/146.1; 49/209
[58] Field of Search ............... 296/146 R, 146 F, 155; 49/209, 212, 254

[56] References Cited

U.S. PATENT DOCUMENTS

| | | | |
|---|---|---|---|
| 2,701,394 | 2/1955 | Anderson | 49/212 |
| 3,440,762 | 4/1969 | Olsson | 49/209 |
| 4,261,610 | 4/1981 | Inamoto et al. | 296/146 F X |
| 4,277,095 | 7/1981 | Barruw | 296/155 X |
| 4,702,514 | 10/1987 | Perry | 296/146 R X |
| 5,083,833 | 1/1992 | Herrmeyer | 296/146 F X |

FOREIGN PATENT DOCUMENTS 118283  5/1991  Japan .................................. 296/155

Primary Examiner—Joseph D. Pape
Attorney, Agent, or Firm—LaValle D. Ptak

[57] ABSTRACT

A vehicle, such as a sport utility vehicle, is provided with a vertically moving panel for opening and closing the rear of the vehicle. The panel is mounted on telescoping tracks located on opposited sides of an opening in the rear of the vehicle, and moves from a closed position covering the opening to an open position located vertically above the vehicle. The panel moves in a plane parallel to the opening in the vehicle; and gas cylinders are provided to facilitate the opening and closing of the panel, and to hold it in an open position after it has been lifted to such a position.

11 Claims, 1 Drawing Sheet

VERTICALLY MOVING VEHICLE DOOR

BACKGROUND

Sport utility vehicles are highly popular in the United States and in other countries. These vehicles typically have a truck-like chassis, with the interior of the vehicle comprising a single compartment extending from the rear to the front dashboard. Such vehicles generally do not have a trunk on them. As a consequence, most of these vehicles include a door or a tailgate at the rear to provide access from outside the vehicle to the interior through the rear. Typically, rear access is obtained through two different types of systems. One system uses a pair of doors, which are vertically hinged on opposite sides of the vehicle body, and which are swung outwardly to permit access through one or both doors, as desired.

Other utility vehicles use a horizontally hinged, drop down tailgate at the lower portion of the body, with a horizontally mounted lift gate which swings upwardly to open the upper portion. Frequently, access is obtained by lifting the lift gate only (some lift gates cover the entire rear of the vehicle from top to bottom) to permit access. These gates necessarily pivot outwardly and upwardly to an open position for such use.

Whether vertically hinged doors or horizontally hinged lift gates and tailgates are used, it is necessary to provide clearance behind the vehicle to permit the opening and closing of these doors, since they move outwardly from the plane of the rear of the vehicle in varying degrees, as they are rotated about their hinges.

Another disadvantage of the horizontally hinged lift gates, particularly for lift gates which extend from the top of the vehicle body to the bottom of the vehicle body, is that the gates are quite large; and the person using them needs to be careful that the lower edge of the lift gate does not strike such person when the lift gate is being opened or closed. To pull such a lift gate downwardly, it is necessary to be able to reach the raised lower edge, which typically is swung up above the vehicle roof in the open position. This requires a substantial reach in some cases; and for persons of short stature, closing such a vehicle lift gate 12 after it has been opened sometimes is difficult.

It is desirable to provide a panel or door for selectively closing the rear of a sport utility vehicle which is easy to use, attractive in use, and which overcomes the disadvantages of the prior art doors and lift gates discussed above.

SUMMARY OF THE INVENTION

It is an object of this invention to provide an improved vehicle body construction.

It is another object of this invention to provide an improved rear door or panel for a sport utility vehicle.

It is an additional object of this invention to provide an improved movable panel for selectively closing an opening in a vehicle body in which the panel moves in a plane parallel to the plane of the opening in the vehicle body.

It is a further object of this invention to provide an improved panel for selectively closing the opening in a sport utility vehicle which moves in a substantially vertical direction above the vehicle in the open position thereof.

In accordance with a preferred embodiment of this invention, a vehicle body has an opening in a portion of the body to permit access therethrough. A panel, which is movable between open and closed positions, is used to selectively close the opening in the body; and the panel overlies the opening in the body when the panel is in the closed position. Guide members are attached to the panel and to the vehicle body adjacent the opening to permit movement of the panel in a plane parallel to the opening in the vehicle body from a closed position to the open position, where the panel is located above the vehicle body.

DETAILED DESCRIPTION

Figure 1:
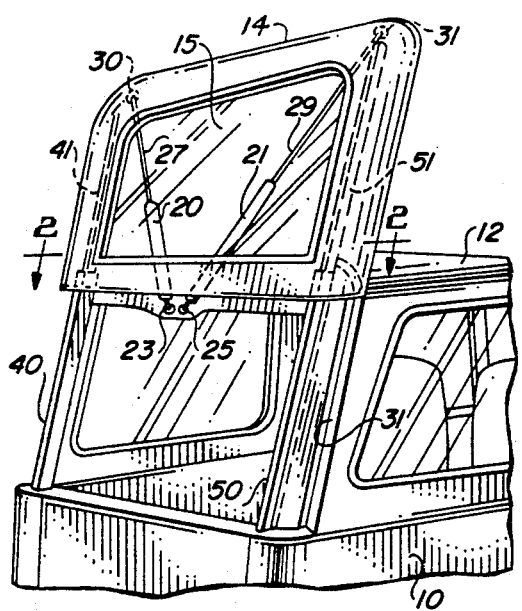
FIG. 1 is a perspective view of a preferred embodiment of the invention in the open position thereof.
Figure 4:
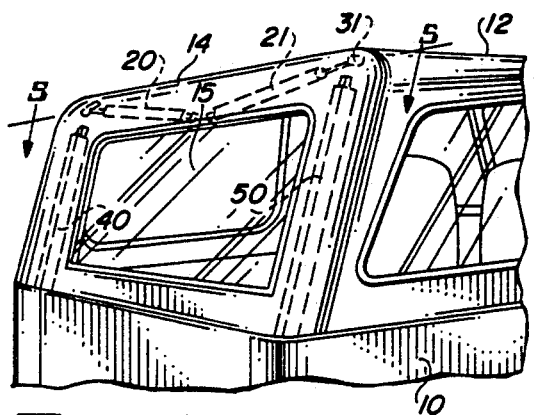
FIG. 4 is a perspective view of the preferred embodiment of the invention shown in the closed position thereof.
Figure 2:
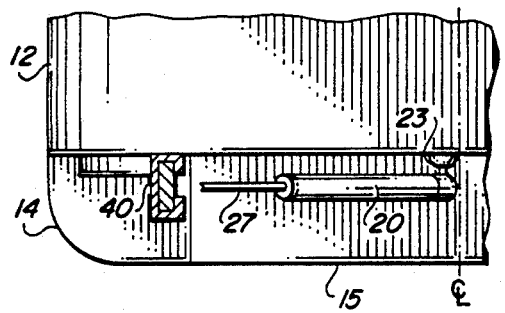
FIG. 2 is a top view taken along the line 2—2 in FIG. 1.
Figure 3:
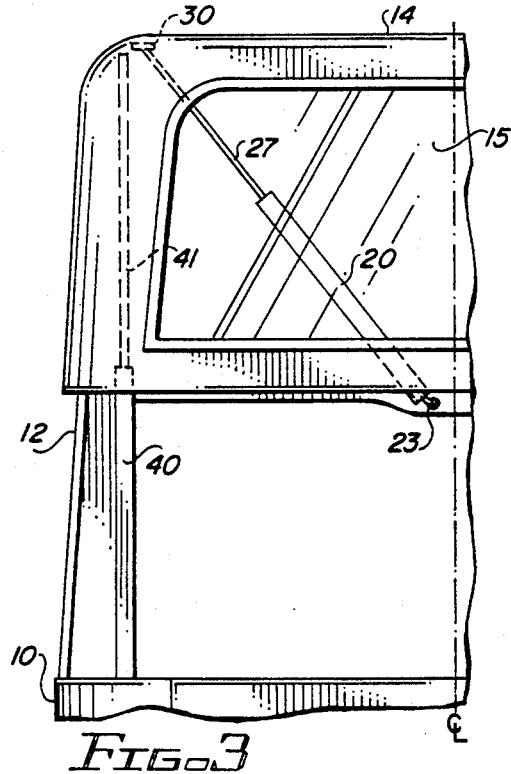
FIG. 3 is a rear view of the embodiment shown in FIG. 1.

Reference now should be made to the drawing, in which the same reference numbers are used throughout the different figures to designate the same components. In FIGS. 2, 3, 5 and 6, only the left half of the apparatus shown in FIGS. 1 and 4 is illustrated, since the vehicle and panel are symmetrical; and the right half is a mirror image of the left half. Discussion first will be made of the invention as shown in FIGS. 1 through 3. In FIG. 1, a rear portion of a vehicle 10 is illustrated with a top body portion 12 attached to it. Such a vehicle, in the general configuration shown in FIG. 1, typically is sport utility vehicle in which the vehicle, as illustrated.

As shown in FIG. 1, a rear door or panel 14 is shown in a raised or open position. The panel 14 is designed to move from a closed position to an open position in a single plane parallel to the plane of the opening in the rear of the vehicle in the body portion 12. In the open position, the panel 14 extends above the top of the body portion 12. The panel 14 also is shown with a window 15 located in the center of it, to form the rear window for the vehicle.

As is readily apparent from an examination of FIG. 1, the panel 14 does not move on a standard pivotal hinge, which is typically used for such vehicles. Instead, the panel 14 moves between a closed position and an open position above the closed position in a plane which is parallel to the rear opening in the body portion 12 of the vehicle. This is accomplished by means of a telescoping guide 40/41 on the left-had side of the panel 14 (as viewed in FIGS. 1 through 3) and a corresponding parallel-mounted telescoping guide 50/51 on the right-hand side. The members 40 and 50 are attached to the rear of the body portion 12 of the vehicle, as illustrated in all of FIGS. 1, 2 and 3. These members are attached directly on the edges of the body opening, as shown in FIG. 3 for member 40; and a mating pair of telescoping members 41 and 51 are attached to the movable panel 14, as illustrated most clearly in FIGS. 1 and 3. The telescoping members 40/41 and 50/51 may be of any suitable type, such as are commonly used for drawer guides in file cabinets and the like. They may be they may be tubular telescoping members.

To limit the movement of the panel 14 in the vertical direction, a pair of gas cylinders 20 and 21, with respective piston rods 27 and 29, are connected to a pair of swivel points 23 and 25, respectively, on the upper portion of the body 12 of the vehicle. The opposite ends of the piston rods 27 and 29 are connected to pivots 30 and 31 located in the upper left and upper right corners, respectively, of the panel 14. The size of the pistons 20 and 21 and the piston rods 27 and 29 determine the maximum height to which the panel 14 may be raised. Additional stops (not shown) also may be provided in conjunction with the telescoping channels 40/41 and 50/51, if desired, to prevent accidental removal of the panel 14 from the vehicle when the panel 14 is raised to the open position.

When the panel 14 is to be moved to its closed position, it may be grasped at its lower edge by a person standing behind the vehicle, and pulled downwardly to the position shown in FIG. 4. When this occurs, the telescoping members 40/41 and 50/51 are telescoped into one another; and the gas cylinders 20 and 21 rotate to the position illustrated in FIG. 4. This causes the piston rods 27 and 29 to collapse into the gas cylinders 20 and 21; and the cylinders and the piston rods pivot about the pivot points 23/25 and 30/31 to the position illustrated in FIG. 4. This causes the panel 14 to completely overlie and close the opening in the rear of the vehicle to close that opening.

Figure 6:
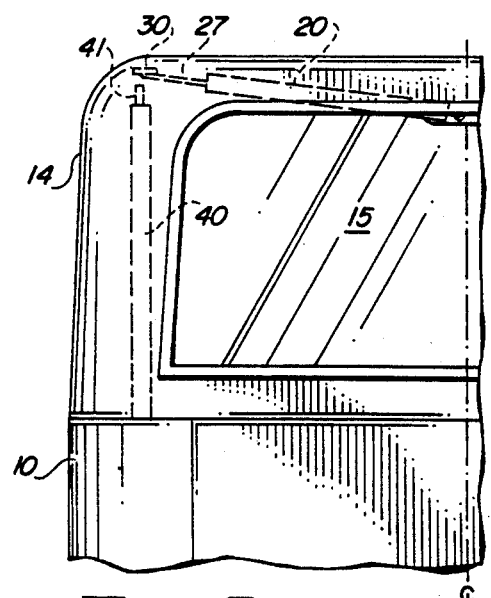
FIG. 6 is a rear view of the device shown in the position in FIG. 4.

As is apparent from an examination of both FIGS. 4 and 6, the cylinders 20 and 21 are located in a position above the window opening 15 in the panel 14. Consequently, the cylinders 20 and 21 are not visible from the exterior of the vehicle when the panel 14 is in the closed position. By mounting the gas cylinders 20 and 21 in the manner shown, the cylinders provide stabilization against side-to-side movement of the panel 14, when the panel 14 is in the open position. This additional stability prevents damage to the telescoping guide channels 40/41 and 50/51, and also assists in maintaining structural stability of the device when it is in the closed position.

Figure 5:
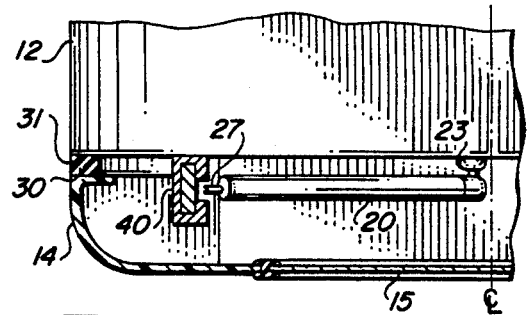
FIG. 5 is a top view taken along the line 5—5 in FIG. 4.

To provide a weather-tight seal when the panel 14 is in the closed position, weather stripping 30 is provided around the inner edge of the panel 14 extending up both sides and around the top of the panel. This weather stripping 30 then seats into a recess or shoulder 31, which similarly extends around the rear portion of the body 12 of the vehicle, as shown most clearly in FIG. 1. When the panel 14 is moved into its fully closed position, as shown in FIGS. 4, 5 and 6, the weather stripping 30 rests securely against the shoulder 31 to prevent water and air from entering the vehicle through the juncture between the panel 14 and the body 12 of the vehicle.

Since the panel 14 moves in a plane which is parallel to the plane of the opening in the rear of the vehicle, no additional clearance is required on either side or behind the vehicle to obtain a full open access to the rear of the vehicle. This is particularly important when the vehicle is in tight quarters. In addition, the bottom of the panel readily may be reached by even persons of short stature, to pull it downwardly from the full open position located above the top of the body portion 12. This is in contrast to lift gates of the type commonly employed with such sport utility vehicles.

The foregoing description of the preferred embodiment should be taken as illustrative, and not as limiting. For example, gas cylinders or the like may be employed as an integral part of the telescoping members 40/41 and 50/51 if desired. The direction of movement and the functional appearance of the device which has been disclosed would be unchanged. Such an arrangement, however, may result in greater bulk at the corners of the device than the apparatus which has been described and which is illustrated. Other changes and modifications may occur to those skilled in the art, without departing from the true scope of the invention as defined in the appended claims.

We claim:

1. An improvement in a vehicle including in combination:
    a vehicle body having an opening in a side portion of the body thereof permitting access to the vehicle interior therethrough,
    a panel movable solely in a single plane between open and closed position for selectively closing the opening in said vehicle body, said panel overlying and sealing said opening in the closed position of said panel;
    guide means attached to said panel and to said vehicle body adjacent said opening for permitting movement of said panel in said single plane parallel to the opening in said vehicle body from said closed position of said panel to said open position of said panel, with said panel in the open position being located above said vehicle body; and
    means located between said panel and said vehicle body for facilitating movement of said panel from said closed position to said open position and for holding said panel in the open position thereof.

2. The combination according to claim 1 wherein said guide means comprises telescoping member means, one portion of which is attached to said vehicle body adjacent said opening and the other portion of which is attached to said panel.

3. The combination according to claim 2 wherein said means for facilitating movement of said panel and for holding said panel comprise gas cylinder means attached between said vehicle body and said panel.

4. The combination according to claim 3 wherein said panel has a window therein, and wherein said guide means are attached to said panel on opposite sides of said window.

5. The combination according to claim 3 wherein said guide means comprises first and second guide members mounted parallel to one another on opposite sides of the opening in said vehicle body and third and fourth guide members for telescoping engagement with said first and second guide members, with said third and fourth guide members mounted parallel to one another on opposite sides of said panel for engaging said first and second guide members.

6. The combination according to claim 1 wherein said guide means comprises first and second parts of first and second telescoping members attached on opposite sides of the opening in said vehicle body and third and fourth cooperating parts of said first and second telescoping members attached to said panel in alignment with said first and second parts attached on opposite sides of said opening.

7. The combination according to claim 1 wherein said means for facilitating movement of said panel and for holding said panel comprise gas cylinder means attached between said vehicle body and said panel.

8. The combination according to claim 1 wherein said guide means comprises first and second guide members mounted parallel to one another on opposite sides of the opening in said vehicle body and third and fourth guide members for telescoping engagement with said first and second guide members, with said third and fourth guide members mounted parallel to one another on opposite sides of said panel for engaging said first and second guide members.

9. The combination according to claim 1 further including weather stripping means on one of said vehicle body and said panel for providing a weather-tight seal between said panel and said vehicle body with said panel in said closed position thereof.

10. An improvement in a vehicle including in combination:
   a vehicle body having an opening in a side portion of the body thereof permitting access to the vehicle interior therethrough;
   a panel movable in a single plane between open and closed positions for selectively closing the opening in said vehicle body, said panel overlying said opening in the closed position of said panel;
   guide means in the form of telescoping members attached to said panel and to said vehicle body on opposite sides adjacent said opening for permitting movement of said panel in said single plane parallel to the opening in said vehicle body from said closed position of said panel to said open position of said panel, with said panel in the open position being located above said vehicle body; and
   first and second gas cylinders for facilitating movement of said panel from said closed position to said open position for holding said panel in the open position thereof wherein said first and second gas cylinders have first and second ends, with the first ends thereof respectively attached to said panel on opposite sides of said opening and with the second ends of said gas cylinders pivotally attached to said vehicle body at the center of the top of the opening therein.

11. The combination according to claim 10 further including weather stripping means on one of said vehicle body and said panel for providing a weather-tight seal between said panel and said vehicle body with said panel in said closed position thereof.

* * * * *